(12) United States Patent  (10) Patent No.: US 7,665,755 B2
Thomsen  (45) Date of Patent:  Feb. 23, 2010

(54) KINGPIN LOCKING SYSTEM FOR TRAILERS

(76) Inventor: Verne E. Thomsen, 1681 County Rd. 16, Ames, NE (US) 68621

( * ) Notice: Subject to any disclaimer, the term of this patent is extended or adjusted under 35 U.S.C. 154(b) by 377 days.

(21) Appl. No.: 11/601,289

(22) Filed: Nov. 17, 2006

(65) Prior Publication Data
US 2007/0063483 A1  Mar. 22, 2007

Related U.S. Application Data

(63) Continuation-in-part of application No. 11/067,862, filed on Feb. 28, 2005, now abandoned.

(51) Int. Cl.
*B60D 1/60* (2006.01)
(52) U.S. Cl. .................... 280/507; 280/432; 70/232; 70/14
(58) Field of Classification Search ............ 280/507, 280/432; 70/232, 14
See application file for complete search history.

(56) References Cited

U.S. PATENT DOCUMENTS

| | | | | |
|---|---|---|---|---|
| 4,132,093 A | * | 1/1979 | McDorman, Sr. ............ 70/231 |
| 4,620,718 A | * | 11/1986 | Mickelson .................. 280/507 |
| 5,464,176 A | * | 11/1995 | Kruse ......................... 246/126 |
| 5,491,992 A | * | 2/1996 | Mandall ....................... 70/232 |
| 6,565,109 B1 | * | 5/2003 | Kloepfer .................... 280/433 |
| 6,761,050 B2 | * | 7/2004 | Rosenberg ..................... 70/14 |
| 7,469,920 B2 | * | 12/2008 | Rosenberg et al. .......... 280/507 |
| 2004/0261470 A1 | * | 12/2004 | Palzkill et al. ................. 70/14 |
| 2005/0242546 A1 | * | 11/2005 | Paquet ........................ 280/507 |
| 2006/0191447 A1 | * | 8/2006 | Ashby et al. ................ 108/119 |
| 2007/0069501 A1 | * | 3/2007 | Hsai ........................... 280/507 |

* cited by examiner

*Primary Examiner*—Lesley D Morris
*Assistant Examiner*—Tashiana Adams
(74) *Attorney, Agent, or Firm*—Dennis L. Thomte; Thomte Patent Law Office LLC

(57) ABSTRACT

An improved kingpin locking system includes a kingpin lock body having upper and lower sections, the lower and upper section each having a truncated generally pyramidal shape, with the lower one being inverted, a central kingpin-receiving chamber formed in the kingpin lock body, a kingpin engagement bar movably mounted in the kingpin lock body adjacent the kingpin-receiving chamber which releasably engages the kingpin when positioned within the chamber, and a kingpin engagement bar locking device which releasably locks the kingpin engagement bar in the engagement position thereby releasably securing the kingpin lock body on a kingpin to prevent unauthorized engagement of the kingpin and thereby preventing unauthorized use of the trailer.

10 Claims, 5 Drawing Sheets

KINGPIN LOCKING SYSTEM FOR TRAILERS

CROSS-REFERENCE TO RELATED PATENTS

This continuation-in-part patent application claims priority based on a Non-Provisional patent application Ser. No. 11/067,862 filed Feb. 28, 2005 now abandoned.

BACKGROUND OF THE INVENTION

1. Technical Field

The present invention is directed to locking and securement devices for kingpins of trailers and, more particularly, to an improved kingpin locking system which includes a kingpin lock body having upper and lower sections, the lower and upper section each having a truncated generally pyramidal shape, with the lower one being inverted, a central kingpin-receiving chamber formed in the kingpin lock body, a kingpin engagement bar movably mounted in the kingpin lock body adjacent the kingpin-receiving chamber which releasably engages the kingpin when positioned within the chamber, and a kingpin engagement bar locking device operative to releasably lock the kingpin engagement bar in the engagement position thereby releasably securing the kingpin lock body on a kingpin to prevent unauthorized engagement of the kingpin and thereby preventing unauthorized use of the trailer.

2. Description of the Prior Art

The kingpin lock is an anti-theft device used to prevent the theft of semi trailers that are unhooked from the semi tractor. The Kingpin Lock is virtually indestructible from ramming the semi tractor fifth wheel plate into the trailer Kingpin if attempted. The lock is designed to jump over the fifth wheel and lodge in front of the fifth wheel making movement of the tractor virtually impossible. The tractor's wheels will hit the semi dollies making any turns impossible. In addition, the ⅞ inch, 45 degree slant (FIG. 2) will have a tendency to catch on the front of the fifth wheel making raising the trailer to free the semi tractor fifth wheel from the trailer very difficult.

SUMMARY OF THE INVENTION

The present invention provides an improved kingpin locking system for the kingpin of a trailer including a kingpin lock body having a lower section having a base wall and an inverted truncated generally pyramidal shape including at least one angled side extending upwards and outwards at an angle between 25° and 70° from vertical, and an upper section having a truncated generally pyramidal shape including a top wall and at least one angled side extending downwards and outwards from the top wall at an angle between 25° and 70°, the lower section having a height greater than the height of the upper section. A central kingpin-receiving chamber is formed in the kingpin lock body, the kingpin-receiving chamber being generally cylindrical in shape and extending downwards from the top wall into the kingpin lock body. A kingpin engagement bar is movably mounted in the kingpin lock body adjacent the kingpin-receiving chamber, the kingpin engagement bar movable between an engagement position extending into the kingpin-receiving chamber and a release position withdrawn from the kingpin-receiving chamber. Finally, a kingpin engagement bar locking device is operatively associated with the kingpin engagement bar for releasably securing the kingpin engagement bar in the engagement position thereby releasably securing the kingpin lock body on a kingpin to prevent unauthorized engagement of the kingpin and thereby preventing unauthorized use of the trailer.

The improved securement system as thus described provides a substantial improvement over the various kingpin locking devices currently available. For example, because the device rotates on the kingpin and does not expose the locking device which engages the kingpin, the standard tools of the trade used by thieves, including crowbars, screwdrivers, sledgehammers and other such lever-type and impact-type breaking and entering devices are rendered ineffective. Also, because the device includes the inverted truncated generally pyramidal shape in both the upper and lower sections of the kingpin lock body, impact removal techniques for removing the kingpin lock are also rendered generally ineffective. Finally, because the present invention is designed to be installed and removed without any specific installation or removal tools, it is far easier to use the present invention than many devices currently being used for protection of trailer kingpins. The present invention thus provides a substantial improvement over those devices and methods found in the prior art.

DESCRIPTION OF THE PREFERRED EMBODIMENT

Figure 1:
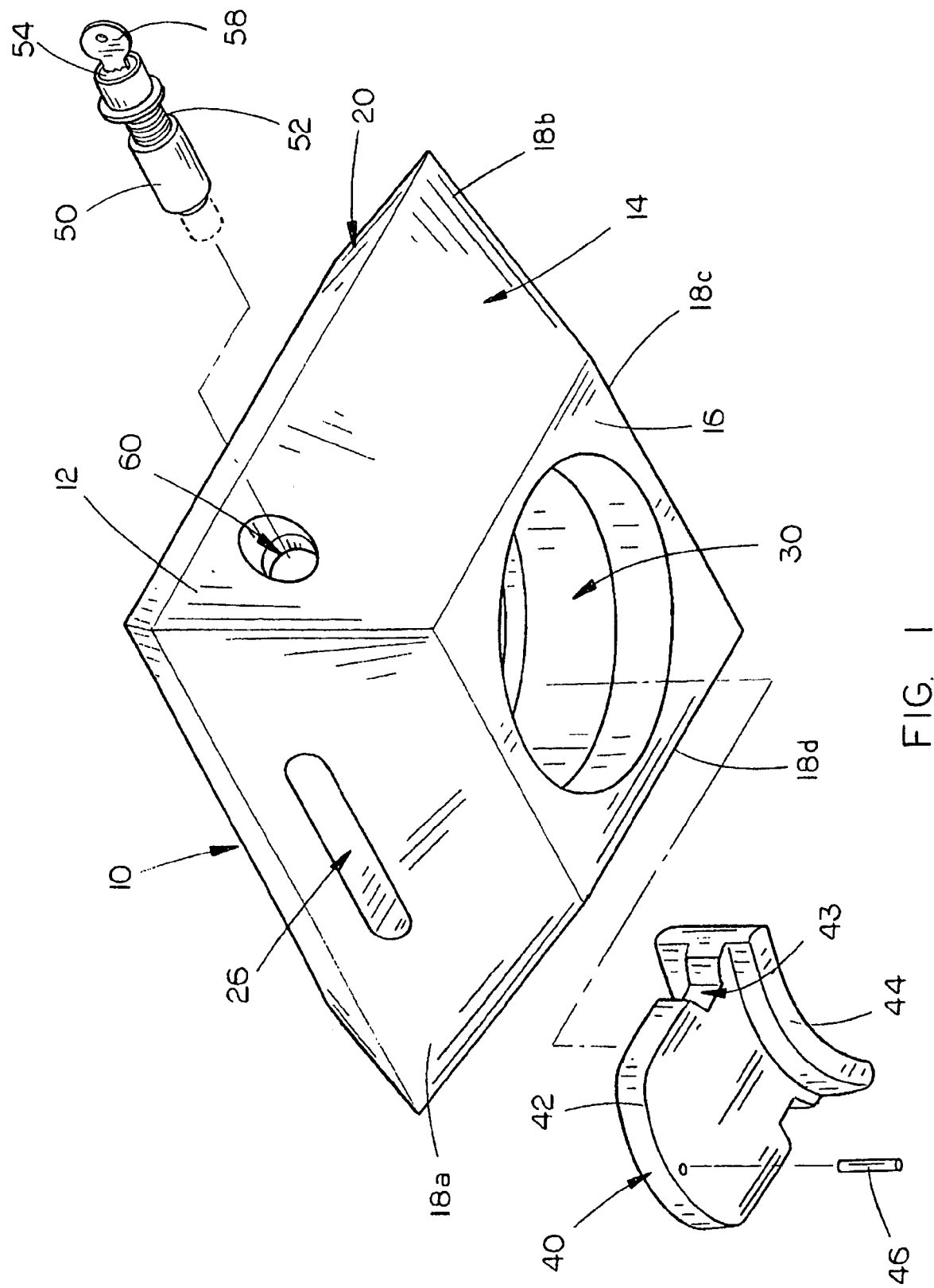
FIG. 1 is a perspective view of the improved kingpin locking device of the present invention.

The Kingpin Lock insert is first poured out of Ductile Steel or similar hardened metal at approximately Rockwell C scale 42 to 48 and tensile strength of 50,000 to 70,000 PSI. After being poured at the foundry, a protective, rust proof coating is applied. Examples of the coatings used are powder and zinc coatings.

The Kingpin Lock is virtually indestructible from ramming the semi tractor fifth wheel plate into the semi trailer kingpin. If this is attempted, the lock is designed to jump over the fifth wheel and loge in front of the fifth wheel making movement of the semi tractor virtually impossible. The semi tractor's wheels will hit the semi dollies making any turns impossible. The ⅞ inch, 45 degree slant shown in FIG. 1 will have a tendency to catch on the front of the fifth wheel making raising the trailer to free the semi tractor fifth wheel from the trailer very difficult and time consuming.

The improved kingpin locking device 10 of the present invention is shown best in FIGS. 1-4 as including a kingpin lock body 12 which, in the preferred embodiment, would include a lower section 14 having a base wall 16 and four angled sides 18a, 18b, 18c, and 18d which each extend upwards and outwards from the base wall to form an inverted generally truncated pyramidal shape. In the preferred embodiment, the kingpin lock body 12 would have overall dimensions of approximately two to four inches in height and approximately five to eight inches in width and length and would preferably be constructed of a lightweight yet extremely strong metal material such as aluminum #356.

Figure 2:
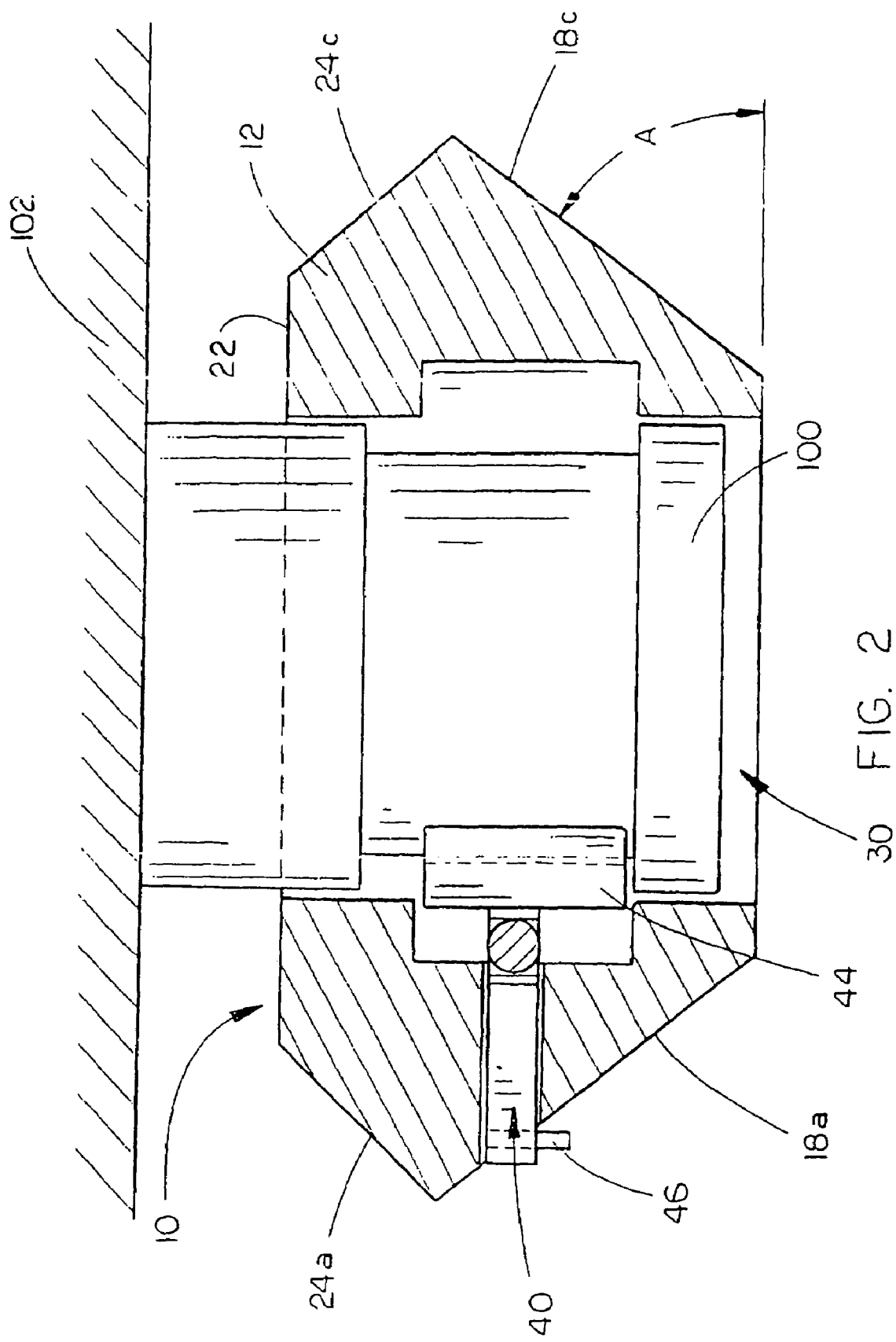
FIG. 2 is a detailed cutaway side elevational view of the lock body showing the kingpin-receiving chamber.

The kingpin lock body 12 would also preferably include an upper section 20 which would preferably include a top wall 22 and side walls 24a, 24b, 24c, and 24d which each extend outwards and downwards from the top wall 22, as shown best in FIGS. 1 and 2. The upper section 20 would therefore have a generally truncated pyramidal shape similar to the shape of lower section 14, although oriented in the opposite direction, and further the overall height of upper section 20 would preferably be substantially less than the overall height of lower section 14 as the side walls 18a-d must have sufficient height and slope to perform their intended function as will be described later in this disclosure.

Extending through the center of the kingpin lock body 12 is a central kingpin-receiving chamber 30 which, in the preferred embodiment, would be generally cylindrical in shape and would extend through the kingpin lock body 12. The diameter of the kingpin-receiving chamber 30 would generally be determined by the size and shape of the kingpin 100 on which the improved kingpin locking device 10 of the present invention is to be mounted. However, generally the kingpin-receiving chamber 30 would have a diameter of approximately two to four inches, which a preferred diameter of approximately two and seven-eighths inches (2⅞") which is slightly larger than the diameter of the standard kingpin 100 used in connection with tractor trailers. It should also be noted that the kingpin-receiving chamber 30 does not necessarily extend entirely through the kingpin lock body 12 as currently shown in the drawings, as it is primarily important that the kingpin-receiving chamber 30 extend downwards from the top wall 22 of upper section 20 into the interior of the kingpin lock body 12 a sufficient distance to permit mounting of the improved kingpin locking device 10 on the kingpin 100 as will be described herein.

To secure the kingpin locking device 10 on the kingpin 100, a kingpin engagement bar 40 is movably mounted in the kingpin lock body 12, preferably within an engagement bar slot 26 which extends through one of the side walls 18a of lower section 14, although the exact location of engagement bar slot 26 in kingpin lock body 12 will generally be determined by the overall height of the kingpin lock body 12 and the positioning of the kingpin 100 within the kingpin lock body 12 when the kingpin lock body 12 is placed upon the kingpin 100. In the preferred embodiment, the kingpin engagement bar 40 would be a generally rectangular plate 42 having an arcuate kingpin engagement plate 44 mounted transversely on the inner end of the rectangular plate 42, as shown best in FIGS. 2-4. The arcuate engagement plate 44 thus prevents the rectangular plate 42 from sliding out of the engagement bar slot 26 in an outwards direction, and it is further preferred that the kingpin engagement bar 40 further include a pin 46 mounted on the outer end of rectangular plate 42 externally of side wall 18a in order to prevent the kingpin engagement bar 40 from sliding inwards out of the engagement bar slot 26 into the kingpin-receiving chamber 30 with which the engagement bar slot 26 is in communication. In this manner, the kingpin engagement bar 40 is allowed to move inwards within engagement bar slot 26 into an engagement position with the arcuate engagement plate 44 of kingpin engagement bar 40 positioned within the kingpin-receiving chamber 30, as shown in FIG. 4, and likewise may be moved outwards within engagement bar slot 26 to a release position in which the kingpin engagement bar 40 is drawn outwards within engagement bar slot 26 to move the arcuate engagement plate 44 out of the kingpin-receiving chamber 30, as shown in FIG. 3.

Figure 3:
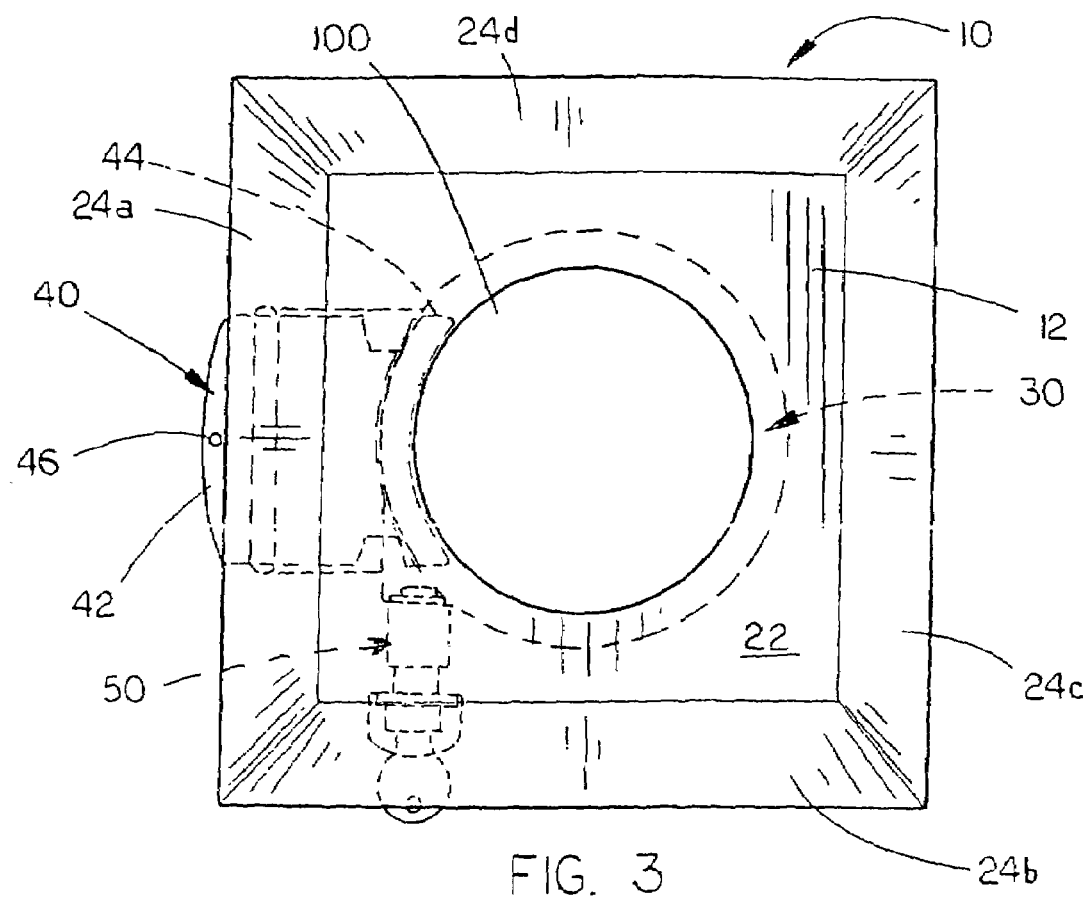
FIGS. 3 and 4 are detailed top plan views of the device showing the kingpin engagement bar in its released position and in its engagement position.
Figure 4:
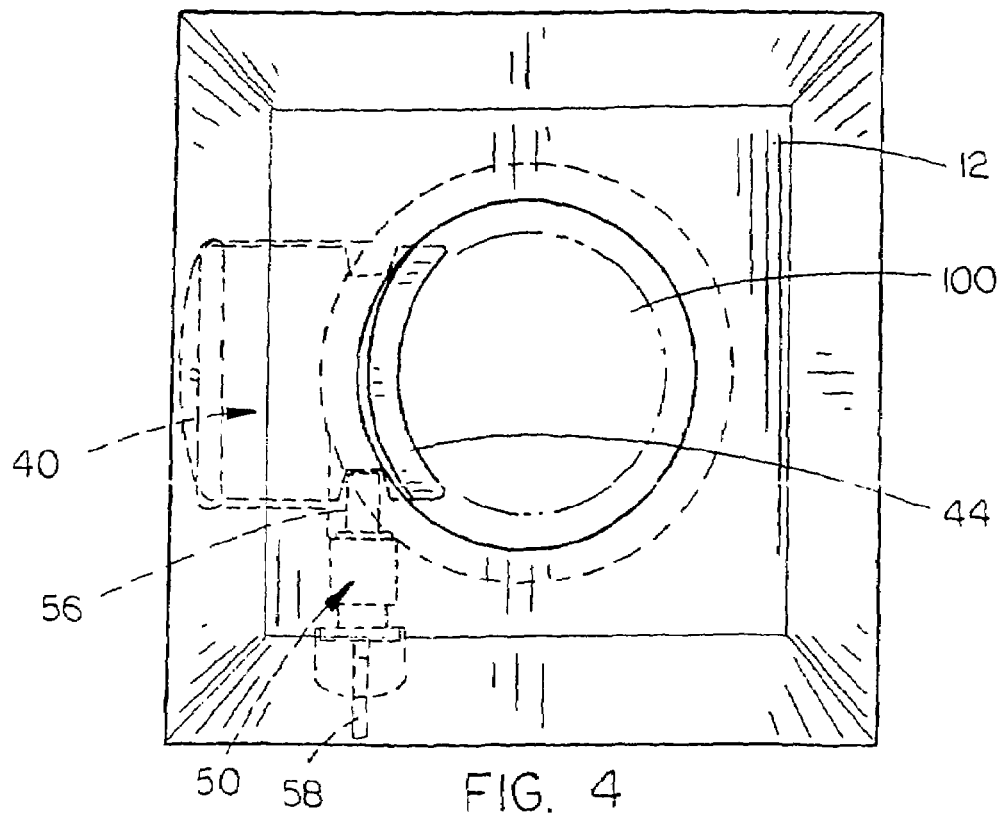

To lock the kingpin engagement bar 40 in its engagement position, a locking device is mounted within the kingpin lock body 12, specifically within a locking device recess 60 formed within and extending through side wall 18b, as shown best in FIGS. 2 and 3. In the preferred embodiment, the locking device 50 would be mounted within the locking device recess 60, the locking device 50 preferably being a Pagoda-type of lock which includes a lock body 52 having a key-operated locking mechanism 54 and a forwardly-extending locking pin 56 which is extended or retracted by operation of the key-operated locking mechanism 54. Pagoda locks are quite common and are used for everything from garage doors and vending machines, and the operational features of such locks are well known in the prior art, therefore these operational features will not be discussed further in this disclosure.

Once the locking device 50 is secured within the locking device recess 60, the key-operated locking mechanism 54 of locking device 50 is accessible on the outside of side wall 18b of lower section 14 so that the key 58 may be inserted into the key-operated locking mechanism 54 for operation of the locking device 50. The opposite end of the locking device 50, specifically where locking pin 56 extends outward therefrom, is positioned in the interior of the kingpin lock body 12 adjacent the kingpin-receiving chamber 30 and particularly adjacent the positioning of kingpin engagement bar 40 when kingpin engagement bar 40 is in its engagement position, i.e. extended inwards into the kingpin-receiving chamber 30 as shown in FIG. 4. In the preferred embodiment, rectangular plate 42 of kingpin engagement bar 40 would further include a pin-receiving recess 43 into which the locking pin 56 extends when locking device 50 is engaged to extend the locking pin 56 forwards. Once the locking pin 56 extends into the pin-receiving recess 43 of rectangular plate 42, the kingpin engagement bar 40 is prevented from moving outwards to its release position and therefore the kingpin engagement bar 40 is retained in its engagement position extended inwards into the kingpin-receiving chamber 30. Once the locking device 50 is disengaged, thus retracting locking pin 56, the kingpin engagement bar 40 is once again allowed to retract to its release position, and the device is then ready for use.

Installation of the improved kingpin locking device 10 on a kingpin 100 is a relatively simple matter in that the kingpin-receiving chamber 30 is aligned with the kingpin 100 with the top wall 22 generally adjacent the kingpin 100. The kingpin locking device 10 is then moved upwards onto the kingpin 100 such that the kingpin 100 fits within the kingpin-receiving chamber 30. Once the kingpin lock body 12 has been moved upwards as far as it can go before top wall 22 would contact the underside of the trailer 102, the operator of the present invention would move the kingpin engagement bar 40 inwards within engagement bar slot 26 until the arcuate engagement plate 44 contacts the side of kingpin 100 above the lowermost part of kingpin 100 where the kingpin 100 flares outwards. The locking device 50 would then be engaged by use of key 58 which extends the locking pin 56 inwards into the pin-receiving recess 43 of rectangular plate 42 thus securing the kingpin engagement bar 40 in its engagement position with arcuate engagement plate 44 contacting kingpin 100 thus securing the kingpin lock body 12 on the kingpin 100, as it is impossible to move the kingpin lock body 12 downwards off of kingpin 100 due to the engagement of kingpin engagement bar 40 with the kingpin 100. Another significant benefit of the present invention is that the kingpin locking device 10 may be rotated on the kingpin 100 even when the arcuate engagement plate 44 contacts the kingpin 100, thus significantly reducing the opportunity for unauthorized persons to remove the kingpin locking device 10 from the kingpin 100 as they will be unable to use many "tools of the trade" commonly used to break kingpin locks off of kingpins. Authorized removal of the improved kingpin locking device 10 from the kingpin 100, however, is quite easy and would be accomplished by reversing the above-described procedures and the kingpin 100 is thus again exposed for connection to a tractor unit for towing of the trailer 102.

Figure 5:
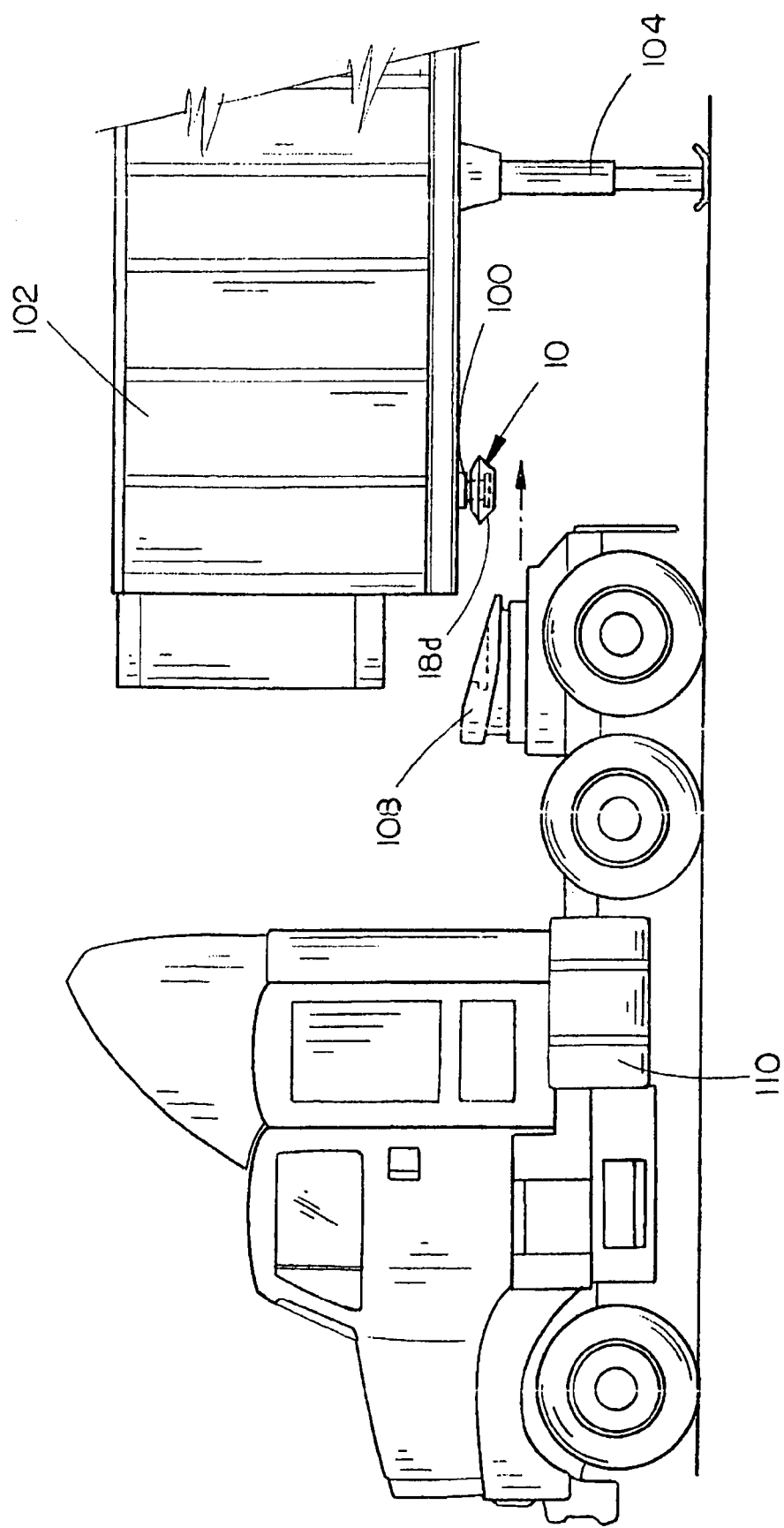
FIG. 5 is a side elevational view of the present invention fitted onto a kingpin and about to be impacted by a tractor unit.
Figure 6:
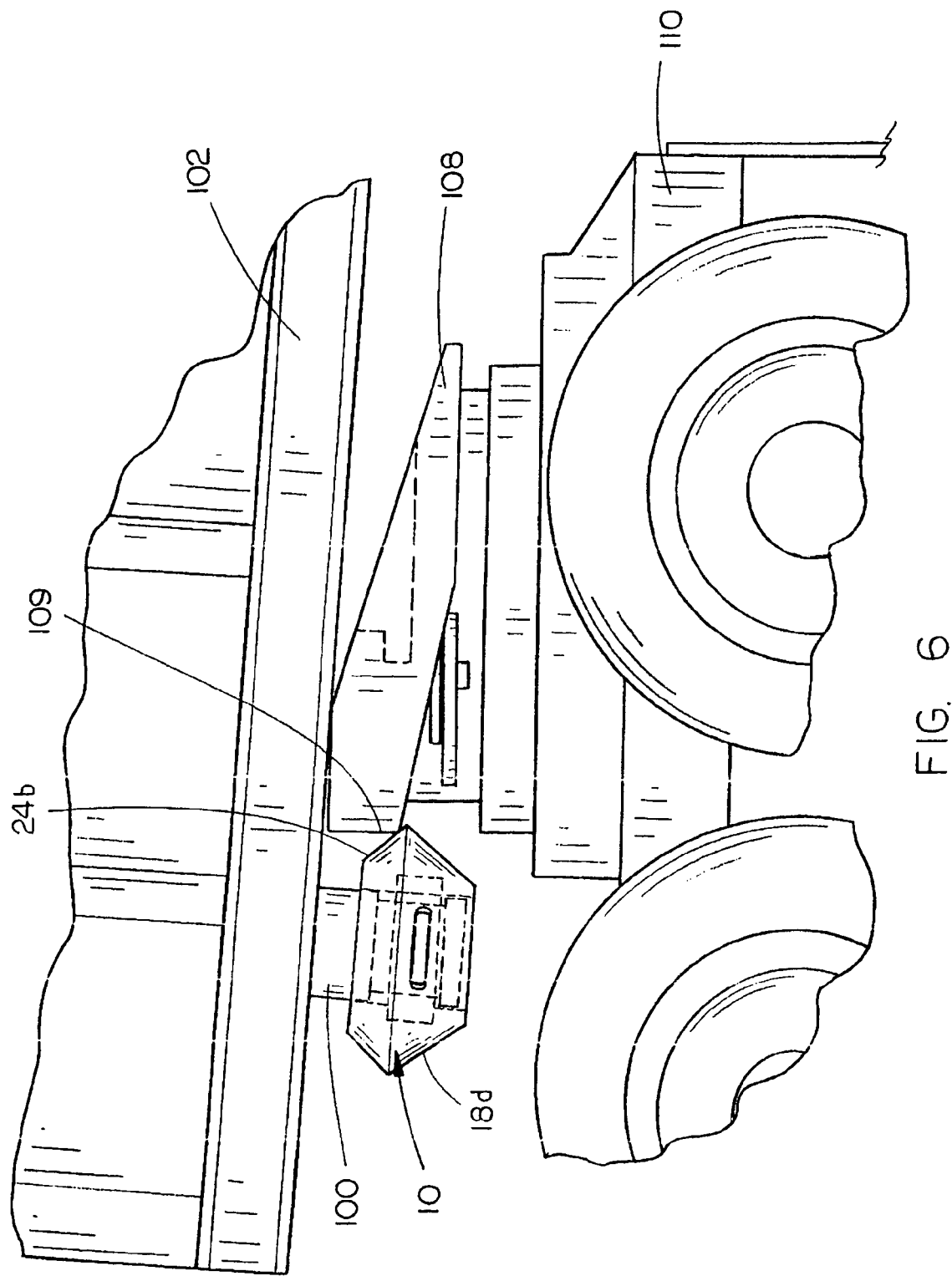
FIG. 6 is a detailed side elevational view of the present invention fitted onto a kingpin which has been impacted by the fifth wheel connector of a tractor unit and which has slid up and over the connector to avoid being removed by the impact.

Of course, the improved kingpin locking device 10 of the present invention serves its primary function of preventing unauthorized access to the kingpin 100 by being secured on the kingpin 100 via the kingpin engagement bar 40 as was described above. However, the truly unique and critical feature of the improved kingpin locking device 10 of the present invention is that the inverted generally truncated pyramidal shape of the lower section 14, as defined by side walls 18a-d and base wall 16, renders it extremely difficult for an unauthorized person to knock off or disengage the kingpin locking device 10 from the kingpin 100. Specifically, this is because the angled side wall 18d will raise the kingpin locking device 10 over the top of the fifth wheel connector 108 which ordinarily connects to the kingpin 100 when the fifth wheel connector 108 is rammed backwards and contacts the angled side wall 18d via the tractor 110, as shown in FIG. 5, in an attempt to dislodge the kingpin locking device 10 from the kingpin 100. The vast majority of kingpin locking devices currently found in the prior art may be dislodged from the kingpin 100 by such an impact from the fifth wheel connector 108, as they have generally upright side walls, but with the present invention, the inverted generally truncated pyramidal shape of the lower section 14 of kingpin lock body 12, specifically the approximately twenty-five to seventy degree (25° to 70°) angle relative to vertical of each of the side walls 18a-d (as shown by the angle A in FIG. 2) allows the kingpin locking device 10 to ride up over the fifth wheel connector 108, as shown in FIGS. 5 and 6, and thus remain on the kingpin 100 to prevent unauthorized access to the kingpin 100. Moreover, because of the dimensions of the lower section 14 of kingpin lock body 12, the kingpin lock body 12 will not fit within the slot of the fifth wheel connector 108 and, as was stated previously, instead will ride up over the fifth wheel connector 108.

Should the individual attempting to ram the kingpin locking device 10 of the present invention continue to reverse their tractor trailer unit 110, the kingpin lock body 12 will reach the front end 109 of the fifth wheel connector 108 and fall back down due to the weight of the trailer 102. The generally truncated pyramidal shape of the upper section 20 would then come into play as the kingpin lock body 12 would become caught on the forward portion of the fifth wheel connector 108, specifically by engagement of the side wall 24b with the front end 109 of the fifth wheel connector 108, which would make unhooking of the trailer 102 from the ramming vehicle 110 a difficult proposition indeed. Specifically, because of the positioning of the semi dollies 104 on the trailer 102, the impacting tractor unit 110 would be positioned with its wheels within one to two feet of the semi dollies 104 when the kingpin locking device 10 engages the front end 109 of the fifth wheel connector 108. The tractor 110 is thus prevented from turning with the trailer 102 because of the close proximity of the semi dollies 104 to the rear wheels of the tractor 110, and thus the person or persons attempting to take or steal the trailer 102 would be prevented from doing so. It is thus seen that the inverted generally truncated pyramidal shape of the lower section 14 and the generally truncated pyramidal shape of the upper section 20 are critical and important features in the kingpin locking device 10 of the present invention and therefore it is believed that those features are deserving of protection.

It is to be understood that numerous additions, substitutions and modifications may be made to the improved kingpin locking device 10 of the present invention which fall within the intended broad scope of the appended claims. For example, although the lower section 14 and upper section 20 have been described as being generally truncated pyramids in shape, it should be noted that a truncated cone or pyramid having fewer than four sides or more than four sides may be substituted for the four-sided pyramid described and shown in the accompanying drawings, so long as the angled side walls of the invention remain as an element thereof. Specifically, it is simply important that the angles between the side walls 18a-d and side walls 24a-d of lower and upper sections 14 and 20 be approximately fifty to one hundred and forty degrees in order to ensure proper functionality of the present invention, although this angle may be adjusted to a great extent so long as the kingpin locking device 10 of the present invention is able to ride up over the fifth wheel connector 108 of a standard tractor unit should the tractor unit attempt to gain unauthorized access to the kingpin 100. Furthermore, the size, shape and construction materials used in connection with the kingpin lock body 12 and other elements of the kingpin locking device 10 of the present invention may be modified or changed so long as the intended functional features are neither substantially degraded nor destroyed. Finally, it should be noted that although the locking device 50 has been described as being a Pagoda-type lock, many different types of locking devices may be used in connection with the present invention so long as the intended function of generally releasably preventing the kingpin engagement bar 40 from moving from its engagement position to the release position is maintained.

There has therefore been shown and described an improved kingpin locking device 10 which accomplishes at least all of its intended objectives.

I claim:

1. An improved kingpin locking system for the kingpin of a trailer comprising:

a kingpin lock body having a lower section having a base wall and an inverted truncated generally pyramidal shape including at least one angled side extending upwards and outwards at an angle between 25° and 70° from vertical, and an upper section having a truncated generally pyramidal shape including a top wall and at least one angled side extending downwards and outwards from said top wall at an angle between 25° and 70°, said lower section having a height greater than the height of said upper section;

a central kingpin-receiving chamber formed in said kingpin lock body, said kingpin-receiving chamber being generally cylindrical in shape and extending downwards from said top wall into said kingpin lock body;

a kingpin engagement bar movably mounted in said kingpin lock body adjacent said kingpin-receiving chamber, said kingpin engagement bar movable between an engagement position extending into said kingpin-receiving chamber and a release position withdrawn from said kingpin-receiving chamber; and kingpin engagement bar locking means operatively associated with said kingpin engagement bar for releasably securing said kingpin engagement bar in said engagement position thereby releasably securing said kingpin lock body on a kingpin to prevent unauthorized engagement of the kingpin and thereby preventing unauthorized use of the trailer.

2. The kingpin locking system of claim 1 wherein said kingpin lock body is constructed of a hardened steel or aluminum material.

3. The kingpin locking system of claim 1 further comprising an engagement bar slot formed in and extending through at least one angled side of said lower section.

4. The kingpin locking system of claim 3 wherein said kingpin engagement bar comprises a generally rectangular plate having an arcuate kingpin engagement plate mounted transversely on the inner end of said generally rectangular plate, said arcuate kingpin engagement plate operative to engage the kingpin by moving inwards within said engagement bar slot into an engagement position with said arcuate engagement plate of said kingpin engagement bar positioned within said kingpin-receiving chamber and contacting the kingpin and is movable outwards within said engagement bar slot to a release position in which said arcuate engagement plate is out of contact with the kingpin.

5. The kingpin locking system of claim 1 wherein said kingpin engagement bar locking means comprises a pagoda lock seated within said kingpin lock body which includes a lock portion and a movable pin section, said pagoda lock operative to extend said pin section into said kingpin engagement bar when said kingpin engagement bar is in said engagement position thereby releasably securing said kingpin engagement bar in contact with the kingpin and securing the kingpin locking system on the kingpin to prevent unauthorized access to the kingpin.

6. An improved kingpin locking system for the kingpin of a trailer comprising:

a kingpin lock body having a lower section having a base wall and an inverted truncated generally pyramidal shape including at least one angled side extending upwards and outwards from said base wall, and an upper section having a truncated generally pyramidal shape including a top wall and at least one angled side extending downwards and outwards from said top wall;

a central kingpin-receiving chamber formed in said kingpin lock body and extending downwards from said top wall into said kingpin lock body;

a kingpin engagement bar movably mounted in said kingpin lock body adjacent said kingpin-receiving chamber, said kingpin engagement bar movable between an engagement position extending into said kingpin-receiving chamber to contact and engage a kingpin housed with said kingpin-receiving chamber and a release position disengaged from the kingpin housed with said kingpin-receiving chamber; and kingpin engagement bar locking means including an extending and retracting locking pin operative to extend said pin section into contact with said kingpin engagement bar when said kingpin engagement bar is in said engagement position thereby releasably securing said kingpin engagement bar in contact with the kingpin and securing the kingpin locking system on the kingpin to prevent unauthorized access to the kingpin.

7. The kingpin locking system of claim 6 wherein said kingpin lock body is constructed of a hardened steel or aluminum material.

8. The kingpin locking system of claim 6 further comprising an engagement bar slot formed in and extending through at least one angled side of said lower section.

9. The kingpin locking system of claim 8 wherein said kingpin engagement bar comprises a generally rectangular plate having an arcuate kingpin engagement plate mounted transversely on the inner end of said generally rectangular plate, said arcuate kingpin engagement plate operative to engage the kingpin by moving inwards within said engagement bar slot into an engagement position with said arcuate engagement plate of said kingpin engagement bar positioned within said kingpin-receiving chamber and contacting the kingpin and is movable outwards within said engagement bar slot to a release position in which said arcuate engagement plate is out of contact with the kingpin.

10. The kingpin locking system of claim 6 wherein said kingpin engagement bar locking means comprises a pagoda lock seated within said kingpin lock body which includes a lock portion and a movable pin section, said pagoda lock operative to extend said pin section into said kingpin engagement bar when said kingpin engagement bar is in said engagement position thereby releasably securing said kingpin engagement bar in contact with the kingpin and securing the kingpin locking system on the kingpin to prevent unauthorized access to the kingpin.

\* \* \* \* \*